US008835558B2

(12) United States Patent
Lee et al.

(10) Patent No.: US 8,835,558 B2
(45) Date of Patent: Sep. 16, 2014

(54) POLYLACTIC ACID/POLYCARBONATE RESIN COMPOSITION AND MOLDED PRODUCT MADE USING THE SAME

(75) Inventors: Hyung-Tak Lee, Uiwang-si (KR); Doo-Han Ha, Uiwang-si (KR); Chang-Do Jung, Uiwang-si (KR); Young-Chul Kwon, Uiwang-si (KR); Jin-Kyung Cho, Uiwang-si (KR); Young-Mi Chung, Uiwang-si (KR); Byung-Choon Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 487 days.

(21) Appl. No.: 12/642,063

(22) Filed: Dec. 18, 2009

(65) Prior Publication Data

US 2010/0160559 A1 Jun. 24, 2010

(30) Foreign Application Priority Data

Dec. 19, 2008 (KR) .................. 10-2008-0130527

(51) Int. Cl.
| | | |
|---|---|---|
| C08L 69/00 | (2006.01) | |
| C08L 67/04 | (2006.01) | |
| C08L 51/04 | (2006.01) | |
| C08L 51/00 | (2006.01) | |
| C08L 33/06 | (2006.01) | |

(52) U.S. Cl.
CPC .............. *C08L 69/00* (2013.01); *C08L 33/06* (2013.01); *C08L 67/04* (2013.01); *C08L 51/04* (2013.01); *C08L 51/003* (2013.01)
USPC .............. 525/67; 525/133; 525/148; 525/450

(58) Field of Classification Search
None
See application file for complete search history.

(56) References Cited

U.S. PATENT DOCUMENTS

| 3,880,783 | A | * | 4/1975 | Serini et al. ............... 525/67 |
|---|---|---|---|---|
| 6,545,089 | B1 | | 4/2003 | DeRudder et al. |
| 7,863,382 | B2 | | 1/2011 | Ishii et al. |
| 2006/0276582 | A1 | | 12/2006 | Mochizuki et al. |
| 2008/0051508 | A1 | | 2/2008 | Hayata et al. |
| 2008/0071038 | A1 | | 3/2008 | Ido |
| 2008/0108754 | A1 | | 5/2008 | Hayata et al. |
| 2009/0270524 | A1 | | 10/2009 | Oka et al. |
| 2010/0028657 | A1 | | 2/2010 | Ito et al. |
| 2010/0160499 | A1 | * | 6/2010 | Cho et al. .................. 524/80 |

FOREIGN PATENT DOCUMENTS

| DE | 112005003395 T5 | | 12/2007 |
|---|---|---|---|
| EP | 1792941 A1 | | 6/2007 |
| EP | 1865021 A1 | | 12/2007 |
| EP | 1953191 A1 | | 8/2008 |
| EP | 2113532 A1 | | 11/2009 |
| JP | 06322224 | * | 11/1994 |
| JP | 2004-190026 A | | 7/2004 |
| JP | 2006-111858 A | | 4/2006 |
| JP | 2006-131828 | | 5/2006 |
| JP | 2006-182994 A | | 7/2006 |
| JP | 2006-199743 | | 8/2006 |
| JP | 2006-335909 A | | 12/2006 |
| JP | 2007-056247 | | 3/2007 |
| JP | 2007-077368 | | 3/2007 |
| JP | 2007-104555 | | 4/2007 |
| JP | 2007-231149 | | 9/2007 |
| JP | 2007-246845 | | 9/2007 |
| JP | 2007-291172 A | | 11/2007 |
| JP | 2007308648 | * | 11/2007 |
| JP | 2008106090 | * | 5/2008 |
| JP | 2008-274222 A | | 11/2008 |
| JP | 2008-303320 A | | 12/2008 |
| KR | 10-2007-0084077 A | | 8/2007 |
| KR | 10-2007-0104555 A | | 10/2007 |
| KR | 10-2008-0072740 A | | 8/2008 |
| WO | 2006/051686 A1 | | 5/2006 |
| WO | 2006/097979 | | 9/2006 |
| WO | 2006/103969 A1 | | 10/2006 |
| WO | 2008/102536 A1 | | 8/2008 |

OTHER PUBLICATIONS

European Search Report in counterpart European Application No. 09180170 dated Dec. 19, 2011, pp. 1-6.
European Search Report in commonly owned European Application No. 09180167 dated Dec. 19, 2011, pp. 1-6.
Office Action in commonly owned U.S. Appl. No. 12/620,841 mailed Jan. 6, 2011, pp. 1-11.
Final Office Action in commonly owned U.S. Appl. No. 12/620,841 mailed Jul. 31, 2011, pp. 1-9.
Notice of Allowance in commonly owned U.S. Appl. No. 12/620,841 mailed Oct. 31, 2011, pp. 1-9.
European Office Action in counterpart European Application No. 09180170.4 dated Aug. 7, 2012, pp. 1-4.

* cited by examiner

*Primary Examiner* — David Buttner
(74) *Attorney, Agent, or Firm* — Additon, Higgins & Pendleton, P.A.

(57) ABSTRACT

Disclosed is a polylactic acid/polycarbonate resin composition including (A) a mixed resin including (a1) a polycarbonate resin and (a2) a polylactic acid resin, and (B) a modified acrylic-based resin, and a molded product made using the same.

8 Claims, No Drawings

POLYLACTIC ACID/POLYCARBONATE RESIN COMPOSITION AND MOLDED PRODUCT MADE USING THE SAME

CROSS REFERENCE TO RELATED APPLICATIONS

This application claims priority to and the benefit of Korean Patent Application No. 10-2008-0130527 filed in the Korean Intellectual Property Office on Dec. 19, 2008, the entire disclosure of which is incorporated herein by reference.

FIELD OF THE INVENTION

The present invention relates to a polylactic acid/polycarbonate resin composition and a molded product made using the same.

BACKGROUND OF THE INVENTION

There has been much research on the development of strong and safe polymer materials for special purposes. However, as discarded polymers have become socially recognized as a severe environmental problem all over the world, there is a need to develop an environmentally-friendly polymer material.

Environmentally friendly polymers may be mainly classified into photodegradable and biodegradable polymers. Biodegradable polymers have a functional group that can be decomposed by microorganisms.

Among these polymers, aliphatic polyester polymer has gained the most attention, since it has excellent workability and easily adjustable decomposition characteristics. In particular, polylactic acid (PLA) has a market share of about 150,000 tons in the world and expansively covers applications where common plastic is used, for example in food packaging materials and containers, cases for electronics, and the like. At present, polylactic acid resin is mainly used for disposable products such as food containers: wraps, films, and the like due to its biodegradable characteristics. Examples of polylactic acid resin are manufactured by American NatureWorks LLC., and Japan Toyota, and the like.

However, since a conventional polylactic acid resin lacks formability, mechanical strength, and heat resistance, a thin film made therefrom can be easily destroyed. Since it has low resistance against high temperatures, a molded product made therefrom can be distorted at 60° C. or higher.

Japanese Patent Laid-Open Publication Nos. 2006-131828 and 2006-199743 disclose a method for improving impact strength and heat resistance by using an impact-reinforcing agent or vinyl-based graft copolymer. However, the disclosed method is limited due to an increasing amount of polylactic acid, and particularly heat resistance may not be exhibited with a heavy load.

Japanese Patent Laid-Open Publication Nos. 2007-231149 and International Patent Laid-Open Publication No. 2006-097979 disclose a method for improving impact strength and heat resistance by using polymethylmethacrylate or an acrylic-based copolymer. However, this method may not realize high heat resistance because the acrylic-based copolymer itself has a lower heat resistance than polycarbonate and hinders crystallization of polylactic acid as well.

SUMMARY OF THE INVENTION

One aspect of the present invention provides a polylactic acid/polycarbonate resin composition that can have a balance of properties such as heat resistance, Impact strength, and mechanical strength.

Another aspect of the present invention provides a molded product made using the polylactic acid/polycarbonate resin composition.

According to one aspect of the invention, a polylactic acid/polycarbonate resin composition is provided that includes (A) a mixed resin including (a1) about 10 to about 90 wt % of a polycarbonate resin and (a2) about 10 to about 90 wt % of a polylactic acid resin; and (B) about 1 to about 20 parts by weight of a modified acrylic-based resin based on about 100 parts by weight of the mixed resin.

The polycarbonate resin may be prepared by reacting one or more diphenols with a compound of phosgene, halogen formate, carbonate ester, or a combination thereof.

The polylactic acid resin includes a repeating unit derived from L-lactic acid, β-lactic acid, L,D-lactic acid, or a combination thereof.

The modified acrylic-based resin may be a copolymer of an alkyl(meth)acrylate monomer; and an aromatic or cyclic ester acrylic-based monomer; a monofunctional unsaturated monomer that is polymerizable with the alkyl(meth)acrylate monomer; or a combination thereof.

Examples of the aromatic or cyclic ester acrylic-based monomer include without limitation cyclohexyl(meth)acrylate, 2-ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, and the like and combinations thereof. Examples of the monofunctional unsaturated monomer that is polymerizable with the alkyl(meth)acrylate monomer include without limitation styrenes, nitriles, unsaturated carboxylic acids, acid anhydrides, hydroxyl-containing acrylates, amides, allylglycidyl ether, glycidyl methacrylate, and the like, and combinations thereof. The modified acrylic-based resin (B) may include the alkyl(meth)acrylate monomer in an amount of about 10 to about 90 wt % based on the total weight of the modified acrylic-based resin (B).

The polylactic acid/polycarbonate resin composition further includes about 1 to about 20 parts by weight of (C) an impact-reinforcing agent based on about 100 parts by weight of the mixed resin. The impact-reinforcing agent comprises a core-shell copolymer obtained by grafting a unsaturated compound comprising an acrylic-based monomer, a hetero cyclic monomer, an aromatic vinyl monomer, an unsaturated nitrile monomer, or a combination thereof, onto a rubber polymer obtaining by polymerization of a diene-based monomer, an acrylic-based monomer, a silicon-based monomer, or a combination thereof.

According to another aspect of this disclosure, a molded product made from the polylactic acid/polycarbonate resin composition is provided.

Hereinafter, further aspects of the present invention will be described in detail.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "polylactic acid/polycarbonate resin" refers to "polylactic acid resin and polycarbonate resin".

As used herein, when a specific definition is not otherwise provided, the term "(meth)acrylate" refers to "acrylate" and "methacrylate".

As used herein, when a specific definition is not otherwise provided, the term "substituted" refers to one substituted with a C1 to C20 alkyl, a C1 to C20 alkoxy, a C6 to C30 aryl, halogen atom, or a combination thereof.

Also, unless there is a specific definition otherwise in the present specification, "hetero cyclic monomer" signifies a structure with a hetero atom of N, O, S or P or a combination thereof in a cyclic compound.

The polylactic acid/polycarbonate resin composition according to one embodiment includes (A) a mixed resin including (a1) a polycarbonate resin and (a2) a polylactic acid resin, and (B) a modified acrylic-based resin.

Exemplary components included in the polylactic acid/polycarbonate resin composition according to embodiments will hereinafter be described in detail. However, these embodiments are only exemplary, and this disclosure is not limited thereto.

(A) Mixed Resin (a1) Polycarbonate Resin

The polycarbonate resin may be prepared by reacting one or more diphenols of the following Chemical Formula 1 with a compound of phosgene, halogenic acid ester, carbonate ester, or a combination thereof.

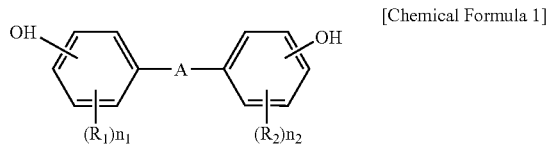

[Chemical Formula 1]

In the above Chemical Formula 1,

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each of $R_1$ and $R_2$ independently comprises substituted or unsubstituted C1 to C30 alkyl or substituted or unsubstituted C6 to C30 aryl, and $n_1$ and $n_2$ are independently integers ranging from 0 to 4.

The term "substituted" refers to one substituted with halogen, C1 to C30 alkyl, C1 to C30 haloalkyl, C6 to C30 aryl, C1 to C20 alkoxy, or a combination thereof.

The diphenols represented by the above Chemical Formula 1 may be used in combinations to constitute repeating units of the polycarbonate resin. Exemplary diphenols include without limitation hydroquinone, resorcinol, 4,4'-dihydroxydiphenyl, 2,2-bis(4-hydroxyphenyl)propane (referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In one embodiment, 2,2-bis(4-hydroxyphenyl)-propane, 2,2-bis(3,5-dichloro-4-hydroxyphenyl)-propane, or 1,1-bis(4-hydroxyphenyl)-cyclohexane may be used. In another embodiment, 2,2-bis(4-hydroxyphenyl)-propane may be used.

In one embodiment, the polycarbonate resin can have a weight average molecular weight ranging from about 10,000 to about 200,000 g/mol, and in another embodiment, a weight average molecular weight ranging from about 15,000 to about 80,000 g/mol.

The polycarbonate resin may be a mixture of copolymers obtained using two or more diphenols that are different from each other. The polycarbonate resin may be a linear polycarbonate resin, a branched polycarbonate resin, a polyester carbonate copolymer, and the like, as well as a combination thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenol(s) and a carbonate. The multi-functional aromatic compound may be included in an amount of about 0.05 to about 2 mol % based on the total weight of the branched polycarbonate resin. The polyester carbonate copolymer resin may include one produced by reacting a difunctional carboxylic acid with diphenol(s) and a carbonate. The carbonate may include a diaryl carbonate such as diphenyl carbonate, and ethylene carbonate.

The mixed resin (A) may include the polycarbonate resin in an amount of about 10 to about 90 wt %, for example about 20 to about 60 wt %, based on the total weight of the mixed resin including the polycarbonate resin and polylactic acid resin. When the polycarbonate resin is included in an amount within these ranges, the composition can have excellent heat resistance and Impact strength and may be environmentally-friendly.

(a2) Polylactic Acid Resin

In general, a polylactic acid resin is a commercially-available polyester-based resin and can be made by using lactic acid obtained by decomposing corn starch with a biomass energy as a monomer.

The polylactic acid resin can include a repeating unit derived from a lactic acid such as L-lactic acid, D-lactic acid, L,D-lactic acid, or a combination thereof.

The polylactic acid resin may include a repeating unit derived from an L-lactic acid in an amount of about 95 wt % or more in terms of balance between heat resistance and formability. In one embodiment, the polylactic acid resin may include a repeating unit derived from an L-lactic acid in an amount of about 95 wt % to about 100 wt % and a repeating unit derived from a D-lactic acid in an amount of about 0 wt % to about 5 wt %. In one embodiment, the polylactic acid resin may include a repeating unit derived from an L-lactic acid in an amount of about 98 to about 99.99 wt % and a repeating unit derived from a D-lactic acid in an amount of about 0.01 to about 2 wt %. When the polylactic acid resin is included as above, excellent hydrolysis resistance as well as balance between heat resistance and formability may be obtained.

In addition, the polylactic acid resin has no specific limit on molecular weight or molecular weight distribution, as long as it can be molded. However, in one embodiment, the polylactic acid resin can have a weight average molecular weight of more than about 80,000 g/mol, and in another embodiment, a weight average molecular weight of about 80,000 to about 300,000 g/mol. When the polylactic acid resin has a weight average molecular weight within the above ranges, molded products with balanced mechanical strength and heat resistance may be provided.

The polylactic acid resin can be a polylactic acid homopolymer, a polylactic acid copolymer, or a combination thereof.

The polylactic acid homopolymer may be prepared through ring-opening polymerization of a lactic acid of the L-lactic acid, the D-lactic acid, or combinations thereof.

The polylactic acid copolymer may be a random or block copolymer with a component that is capable of being copolymerized with the polylactic acid polymer. The component that is capable of being copolymerized with the polylactic acid polymer may include a compound having at least two functional groups being capable of forming an ester-bond in the molecular structure.

Exemplary compounds having at least two functional groups being capable of forming an ester-bond in the molecular structure include without limitation (a) dicarboxylic acids, (b) polyhydric alcohols, (c) hydroxy carboxylic acids excluding lactic acid, (d) lactones, (e) polyesters, polyethers, polycarbonates, and the like, which are derived from the above compounds.

Exemplary dicarboxylic acids (a) include without limitation C4 to C50 linear or branched saturated or unsaturated aliphatic dicarboxylic acids, C8 to C20 aromatic dicarboxylic acids, polyether dicarboxylic acids, and the like, and combinations thereof.

Exemplary aliphatic dicarboxylic acids may include without limitation succinic acid, adipic acid, sebacin acid, decane dicarboxylic acid, and the like, and combinations thereof. Exemplary aromatic dicarboxylic acids may include without limitation phthalic acid, terephthalic acid, isophthalic acid, and the like, and combinations thereof. Exemplary polyether dicarboxylic acids may include without limitation polyalkylene ethers such as polyethylene glycol, polypropylene glycol, polybutylene glycol, polyethylene polypropylene glycol, and the like, and combinations thereof with a carboxyl methyl group at both ends.

Exemplary polyhydric alcohols (b) include without limitation aliphatic polyols, aromatic polyhydric alcohols, polyalkylene ethers, and the like, and combinations thereof.

Exemplary aliphatic polyols include without limitation C2 to C50 aliphatic polyols including 2 to 4 hydroxy groups such as butane diol, hexane diol, octane diol, decane diol, 1,4-cyclohexanedimetanol, glycerine, sorbitan, trimethylolpropane, neopentyl glycol, and the like, and combinations thereof.

Exemplary aromatic polyhydric alcohols may include without limitation C6 to C20 aromatic diols such as bishydroxy methyl benzene, hydroquinone, and the like, and combinations thereof and aromatic diols prepared by additionally reacting a C2 to C4 alkylene oxide such as ethylene oxide, propylene oxide, butylene oxide, and the like with bisphenols such as bisphenol A, bisphenol F, and the like, and combinations thereof.

Exemplary polyalkylene ethers may include without limitation ether glycols such as polyethylene glycol, polypropylene glycol, and the like, and combinations thereof.

Exemplary hydroxy carboxylic acids (c) excluding lactic acid may include without limitation C3 to C10 hydroxy carboxylic acids such as glycolic acid, hydroxy butyl carboxylic acid, 6-hydroxy caproic acid, and the like, and combinations thereof.

Exemplary lactones (d) include without limitation glycolide, ε-caprolactone glycolide, ε-caprolactone, β-propinolactone, δ-butyrolactone, β-butyrolactone, γ-butyrolactone, δ-valerolactone, and the like, and combinations thereof.

The polyesters, polyethers, or polycarbonates (e) can be any generally used one for preparing a lactic acid copolymer without limitation, and in one embodiment, polyester may be used.

The polyester may include an aliphatic polyester prepared from an aliphatic dicarboxylic acid and an aliphatic diol.

Exemplary aliphatic dicarboxylic acids may include without limitation succinic acid, adipic acid, sebacin acid, decanedicarboxylic acid, and the like, and combinations thereof. The aliphatic diol may include a C2 to C20 aliphatic diol ethylene glycol, propane diol, butane diol, hexane diol, octane diol, and the like, a polyalkylene ether (homopolymer or copolymer) such as polyethylene glycol, polypropylene glycol, polybutylene glycol, and the like, and polyalkylene carbonate and the like, and combinations thereof.

The mixed resin (A) may include the polylactic acid resin in an amount of about 10 to about 90 wt %, for example about 20 to about 80 wt %, based on the total amount of the mixed resin of the polycarbonate resin and polylactic acid resin. When the polylactic acid resin is included within the above ranges, excellent heat resistance and mechanical strength may be obtained, and the environmentally-friendly effect can be improved.

(B) Modified Acrylic-Based Resin

The modified acrylic-based resin may include an alkyl (meth)acrylate monomer; and a copolymer formed of an aromatic or cyclic ester acrylic-based monomer, a monofunctional unsaturated monomer capable of being copolymerized with an alkyl(meth)acrylate monomer, or a combination thereof.

Exemplary alkyl(meth)acrylate monomers include without limitation alkylmethacrylates such as methylmethacrylate, ethylmethacrylate, propylmethacrylate, and butylmethacrylate; alkylacrylates such as methylacrylate, ethylacrylate, propylacrylate, butylacrylate, and 2-ethylhexylacrylate; and the like, and combinations thereof. As used herein with reference to the alkyl(meth)acrylate monomer, the term alkyl refers to a C1 to C10 alkyl.

The aromatic ester acrylic based monomer may be acrylic based monomer including substituted or non-substituted C6 to C30 aryl, and the cyclic ester acrylic based monomer may be acrylic based monomer including substituted or non-substituted C3 to C20 cycloalkyl, substituted or non-substituted C3 to C20 cycloalkenyl, or substituted or non-substituted C3 to C20 cycloalkynyl.

Exemplary aromatic or cyclic ester acrylic-based monomers include without limitation cyclohexyl(meth)acrylate, 2-ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)

ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate and the like, and combinations thereof, but is not limited thereto.

Exemplary monofunctional unsaturated monomers that may be copolymerized with the alkyl(meth)acrylate monomer may include without limitation styrenes such as styrene and α-methylstyrene; nitriles such as acrylonitrile, methacrylonitrile, and ethacrylonitrile; unsaturated carboxylic acids such as acrylic acid and methacrylic acid; acid anhydrides such as maleic anhydride; hydroxy-containing acrylates such as 2-hydroxyethylacrylate, 2-hydroxypropylacrylate, and monoglycerolacrylate; amides such as acrylamide and methacrylamide; allylglycidylether; glycidylmethacrylate; and the like, and combinations thereof.

Non-limiting examples of the modified acrylic-based resin according to one embodiment include a copolymer formed of an alkylmethacrylate monomer and an aromatic or cyclic ester acrylic-based monomer, and a copolymer formed of an alkylmethacrylate monomer and a styrene and a nitrile.

The modified acrylic-based resin (B) can include the alkyl (meth)acrylate monomer in an amount ranging from about 10 wt % to about 90 wt %, for example from about 30 wt % to about 50 wt %, based on the total quantity of a monomer constituting the modified acrylic-based resin (B). When the alkyl(meth)acrylate monomer is included in an amount within these ranges, the heat resistance and appearance characteristics can be excellent.

The modified acrylic-based resin according to one embodiment may be polymerized using a conventional bulk polymerization, an emulsion polymerization or a suspension polymerization.

The modified acrylic-based resin can have a higher refractive index than a typical acrylic-based resin such as polymethylmethacrylate. The modified acrylic-based resin according to one embodiment may have a refractive index ranging from about 1.50 to about 1.58. When the modified acrylic-based resin has a refractive index in this range, the compatibility and transparency can be improved so that when it is blended with polycarbonate resin, it can blend well, and thus the impact resistance and the heat resistance of the polylactic acid/polycarbonate resin composition may be improved.

The weight average molecular weight of the modified acrylic-based resin may range from about 5,000 to about 200,000 g/mol. When the modified acrylic-based resin has a weight average molecular weight in this range, carbonization or decomposition may not occur during compounding, and an excellent compatibility with polycarbonate resin can be acquired as well as excellent transparency.

The polylactic acid/polycarbonate resin composition may include the modified acrylic-based resin in an amount ranging from about 1 part by weight to about 20 parts by weight, for example, from about 5 parts by weight to about 15 parts by weight, based on about 100 parts by weight of the mixed resin including the polycarbonate resin and polylactic acid resin. When the modified acrylic-based resin is included in an amount in the above range, it is possible to acquire excellent compatibility with polycarbonate resin, impact resistance and heat resistance.

(C) Impact-Reinforcing Agent

The polylactic acid/polycarbonate resin composition may further include an impact-reinforcing agent.

The impact-reinforcing agent has a core-shell structure where unsaturated monomers are grafted into a rubber core to form a hard shell. The impact-reinforcing agent is a core-shell type copolymer obtained by grafting a unsaturated compound comprising an acrylic-based monomer, a hetero cyclic monomer, an aromatic vinyl monomer, an unsaturated nitrile monomer, or a combination thereof, onto a rubber polymer obtaining by polymerization of a diene-based monomer, an acrylic-based monomer, a silicon-based monomer, or a combination thereof.

The diene-based monomer includes C4 to C6 butadiene, isoprene, and the like, and combinations thereof. Exemplary rubber polymers obtained from polymerization of the diene-based monomer include without limitation a butadiene rubber, an acrylic rubber, a styrene/butadiene rubber, an acrylonitrile/butadiene rubber, an isoprene rubber, a terpolymer (EPDM) of ethylene-propylene-diene, and the like, and combinations thereof.

Exemplary acrylic-based monomers include without limitation methyl(meth)acrylate, ethyl(meth)acrylate, n-propyl (meth)acrylate, n-butyl(meth)acrylate, hexyl(meth)acrylate, 2-ethylhexyl(meth)acrylate, and the like, and combinations thereof. Curing agents such as ethylene glycol di(meth)acrylate, propylene glycol di(meth)acrylate, 1,3-butylene glycol di(meth)acrylate, 1,4-butylene glycol di(meth)acrylate, allyl (meth)acrylate, triallylcyanurate, and the like may be used along with the acrylic-based monomer.

The silicon-based monomer can include without limitation a cyclosiloxane compound, such as but not limited to hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof.

Curing agents such as trimethoxymethylsilane, triethoxyphenylsilane, tetramethoxysilane, tetraethoxysilane, and the like may be used along with the silicon-based monomer.

The rubber polymer can have an average particle diameter ranging from about 0.4 μm to about 1 μm in terms of balance of impact resistance and coloring properties.

Exemplary acrylic-based monomers of the unsaturated compound may include without limitation (meth)acrylic acid alkyl esters, (meth)acrylic acid esters, and the like, and combinations thereof. As used herein with regard to the term "(meth)acrylic acid alkyl ester," the alkyl is a C1 to C10 alkyl. Exemplary (meth)acrylic acid alkyl esters include without limitation methyl(meth)acrylate, ethyl(meth)acrylate, propyl (meth)acrylate, butyl(meth)acrylate, and the like, and combinations thereof. Exemplary (meth)acrylic acid esters include without limitation (meth)acrylate, and the like.

The heterocyclic monomer may be substituted or non-substituted C2 to C20 cycloalkyl compound, substituted or non-substituted C2 to C20 cycloalkenyl compound, or substituted or non-substituted C2 to C20 cycloalkynyl compound. Exemplary hetero cyclic monomers may include without limitation maleic anhydride, alkyl or phenyl N-substituted maleimide, and the like, and combinations thereof.

Exemplary aromatic vinyl monomers include without limitation styrene, C1-C10 alkyl-substituted styrene, halogen-substituted styrene, and the like, and combinations thereof. Exemplary alkyl substituted styrenes include without limitation o-ethyl styrene, m-ethyl styrene, p-ethyl styrene, α-methyl styrene, and the like, and combinations thereof.

Exemplary unsaturated nitrile monomers include without limitation acrylonitrile, methacrylonitrile, ethacrylonitrile, and the like, and combinations thereof.

Non-limiting examples of a polymer formed of at least one monomer among the unsaturated compounds include polymethylmethacrylate.

The copolymer of a core-shell structure may have an average particle size ranging from about 0.1 μm to about 0.5 μm. When the copolymer has an average particle size in the above range, the copolymer may be dispersed well into the matrix of the polylactic acid resin, and when an external impact is applied, the impact may be easily absorbed to thereby increase the impact-reinforcement effect.

The copolymer of the core-shell structure may include the rubber polymer in an amount ranging from about 50 wt % to about 90 wt % and an unsaturated compound grafted thereto in an amount ranging from about 10 wt % to about 50 wt %. When the copolymer of the core-shell structure includes the components in the above ratio, the compatibility with the polylactic acid resin can be excellent to thereby maximize the impact-reinforcement effect.

The polylactic acid/polycarbonate resin composition may include the impact-reinforcing agent in an amount ranging from about 1 part by weight to about 20 parts by weight, for example, from about 3 to about 10 parts by weight, based on about 100 parts by weight of the mixed resin including the polycarbonate resin and polylactic acid resin. When the impact-reinforcing agent is included in an amount in the above range, it is possible to acquire impact reinforcement and heat resistance and improve mechanical strength such as tensile strength, flexural strength, and flexural modulus.

(D) Other Additive(s)

The polylactic acid/polycarbonate resin composition according to one embodiment may further include one or more additive(s).

Exemplary additives may include without limitation anti-hydrolysis agents, flame retardants, flame-retardant aids, organic or inorganic reinforcing agents, antibacterial agents, heat stabilizers, antioxidants, release agents, light stabilizers, compatibilizers, inorganic material additives, surfactants, coupling agents, plasticizers, admixtures, stabilizers, lubricants, antistatic agents, flame proofing agents, weather-resistance agents, colorants, ultraviolet (UV) blocking agents, filler, nucleating agents, adhesion aids, adhesives, and the like, and combinations thereof.

Exemplary antioxidants may include without limitation phenol-type antioxidants, phosphite-type antioxidants, thio-ether-type antioxidants, amine-type antioxidants, and the like, and combinations thereof. Exemplary release agents may include without limitation fluorine-containing polymers, silicone oils, metal salts of stearic acid, metal salts of montanic acid, montanic acid ester waxes, polyethylene waxes, and the like, and combinations thereof. Exemplary weather-resistance agents may include without limitation benzophenone-type weather-resistance agents, amine-type weather-resistance agents and the like, and combinations thereof. Exemplary colorants may include without limitation dyes, pigments, and the like, and combinations thereof. Exemplary ultraviolet (UV) blocking agents may include without limitation titanium oxide ($TiO_2$), carbon black, and the like, and combinations thereof. Exemplary filler may include without limitation glass fiber, carbon fiber, silica, mica, alumina, clay, calcium carbonate, calcium sulfate, glass beads, and the like, and combinations thereof. When the fillers are added, properties such as mechanical strength, heat resistance, and the like may be improved. In addition, exemplary nucleating agents may include without limitation talc, clay, and the like, and combinations thereof.

The additive may be include in an amount of about 0.1 part by weight to about 30 parts by weight based on about 100 parts by weight of the mixed resin including the polycarbonate resin and polylactic acid resin. When the additive is included within the above range, addition effect of each additive may be realized and excellent mechanical strength and improved surface appearance may be obtained.

The polylactic acid/polycarbonate resin composition according to one embodiment may be prepared by mixing and processing a polycarbonate resin, a polylactic acid resin, a modified acrylic-based resin and an impact-reinforcing agent together. In other words, according to one embodiment, a polycarbonate resin, a polylactic acid resin, a modified acrylic-based resin and an impact-reinforcing agent may be simultaneously mixed, or a master batch may be prepared by mixing the polylactic acid and the impact-reinforcing agent and used.

When the master batch is prepared and used, the viscosity difference between the polycarbonate resin and the polylactic acid resin may be reduced as the fluidity of the polylactic acid resin having a lower viscosity than the polycarbonate resin is decreased by an impact-reinforcing agent.

Also, pellets may be fabricated using conventional methods by using the polylactic acid/polycarbonate resin composition according to one embodiment. For example, the constituent components of the polylactic acid/polycarbonate resin composition may be mixed optionally with an additive and melt-extruded in an extruding machine to thereby fabricate the pellets.

According to another embodiment, a molded product is manufactured by molding the polylactic acid/polycarbonate resin composition. The polylactic acid/polycarbonate resin composition may be used to manufacture molded products for use in applications in which heat resistance, impact strength and mechanical strength are regarded important and/or required, such as automobiles, mechanical parts, electronic parts, communication equipment, office equipment, and general merchandise.

The following examples illustrate this disclosure in more detail.

However, they are exemplary embodiments and are not limiting.

EXAMPLES

Each component of polylactic acid/polycarbonate resin composition is as follows.

(A) Mixed Resin (a1) Polycarbonate Resin

PANLITE L 1225WX produced in TEIJIN CHEMICALS LTD., Japan, is used.

(a2) Polylactic Acid Resin 4032D produced in NatureWorks LLC company, the U.S., is used.

(B) Modified Acrylic-Based Resin (b1) A copolymer prepared by emulsion-polymerizing a styrene monomer, an acrylonitrile monomer and a methylmethacrylate monomer is used, (b2) A copolymer prepared by emulsion-polymerizing a phenyl methacrylate monomer and a methylmethacrylate monomer is used.

(B') Acrylic-Based Resin

As for a polymethylmethacrylate resin, L-84 produced by Mitsubishi Rayon Co., Japan, is used.

(C) Impact-Reinforcing Agent

METABLENE S-2100 produced by Mitsubishi Rayon Co., Japan, is used.

Examples 1 to 6 and Comparative Examples 1 to 3

Pellets are fabricated by extruding a composition of the above-mentioned components in the amounts presented in the following Table 1 with an extruding machine having a feed rate of about 40 kg/hr, a screw RPM of about 240, a temperature of about 200° C. to about 250° C., a screw configuration of about 45φ Regular, and L/D=36.

Experimental Examples

Physical specimens are prepared by drying the pellets prepared according to Examples 1 to 6 and Comparative Examples 1 to 3 at about 80° C. for about 4 hours, using an injection molding machine with an injection molding capacity of about 6 oz, setting a cylinder temperature at about 210° C. to about 230° C., a metallic molding temperature at about −100° C., and a molding cycle time at about 30 seconds, and injection-molding ASTM dumbbell specimens. The physical properties of the prepared physical specimens are measured in accordance with the following method and the results are shown in the following Table 1.

(1) Thermal distortion temperature (HDT): measured according to ASTM D648.
(2) Izod Impact strength: measured according to ASTM D256A.
(3) Flexural strength: measured according to ASTM D790.
(4) Flexural modulus: measured according to ASTM D790.
(5) Tensile strength: measured according to ASTM D638.

TABLE 1

|  |  | unit | Example | | | | | | Comparative Example | | |
|---|---|---|---|---|---|---|---|---|---|---|---|
|  |  |  | 1 | 2 | 3 | 4 | 5 | 6 | 1 | 2 | 3 |
| (A) mixed resin | (a1) polycarbonate resin | wt % | 60 | 60 | 60 | 50 | 50 | 50 | 50 | 60 | 50 |
|  | (a2) polylactic acid resin | wt % | 30 | 30 | 25 | 45 | 40 | 35 | 25 | 30 | 40 |
| (B) modified acrylic-based resin | (b1) | wt % | 10 | 10 | — | 5 | 10 | — | 30 | — | — |
|  | (b2) | wt % | — | — | 15 | — | — | 15 | — | — | — |
| (B') acrylic-based resin (polymethylmethacrylate) |  | wt % | — | — | — | — | — | — | — | 10 | 10 |
| (C) impact-reinforcing agent |  | parts by weight* | — | 5 | 10 | — | 15 | 10 | — | 10 | 15 |
| thermal distortion temperature (18.5 kgf) |  | ° C. | 125 | 115 | 110 | 100 | 91 | 90 | 76 | 80 | 65 |
| ⅛" Izod Impact strength |  | kgf · cm/cm | 21 | 55 | 65 | 20 | 75 | 57 | 5 | 52 | 50 |
| flexural strength |  | kgf/cm² | 880 | 860 | 840 | 900 | 850 | 870 | 700 | 820 | 750 |
| flexural modulus |  | kgf/cm² | 24000 | 23000 | 22000 | 25000 | 23000 | 23000 | 19000 | 22000 | 20000 |
| tensile strength |  | kgf/cm² | 580 | 560 | 570 | 580 | 600 | 590 | 550 | 560 | 570 |

*parts by weight is a unit indicating an amount by taking the total amount of (A) mixed resin and (B) modified acrylic-based resin or (B') acrylic-based resin as 100 parts by weight.

It may be seen from Table 1 that the compositions prepared according to Examples 1 to 6 have an excellent balance of physical properties, such as heat resistance, impact resistance and mechanical strength, e.g., flexural strength, flexural modulus and tensile strength.

Meanwhile, for the composition prepared according to Comparative Example 1 including the modified acrylic-based resin in an amount outside the range of the present invention, the impact resistance is remarkably deteriorated. Also, the compositions of Comparative Examples 2 and 3 including polymethylmethacrylate instead of modified acrylic-based resin have deteriorated heat resistance and mechanical strength.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polylactic acid/polycarbonate resin composition comprising
    (A) a mixed resin including (a1) about 10 to about 90 wt % of a polycarbonate resin and (a2) about 10 to about 90 wt % of a polylactic acid resin; and
    (B) about 1 to about 20 parts by weight of a modified acrylic-based resin based on about 100 parts by weight of the mixed resin,
    wherein the modified acrylic-based resin (B) comprises a copolymer of an alkyl(meth)acrylate monomer; an aromatic acrylic-based monomer; and optionally a cyclic ester acrylic-based monomer, a monofunctional unsaturated monomer polymerizable with the alkyl(meth)acrylate monomer, or a combination thereof, and
    wherein the modified acrylic-based resin (B) includes the alkyl(meth)acrylate monomer in an amount of about 30 to about 50 wt % based on the total weight of the modified acrylic-based resin (B).

2. The polylactic acid/polycarbonate resin composition of claim 1, wherein the polycarbonate resin is prepared by reacting one or more diphenols with a compound of phosgene, halogen formate, carbonate ester, or a combination thereof.

3. The polylactic acid/polycarbonate resin composition of claim 1, wherein the polylactic acid resin comprises a repeating unit derived from L-lactic acid, D-lactic acid, L,D-lactic acid, or a combination thereof.

4. The polylactic acid/polycarbonate resin composition of claim 1, wherein the aromatic ester acrylic-based monomer comprises 2-ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-(2-methylphenyl)ethyl(meth)acrylate, 2-(3-methylphenyl)ethyl(meth)acrylate, 2-(4-methylphenyl)ethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)

ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, or a combination thereof.

5. The polylactic acid/polycarbonate resin composition of claim 1, wherein the monofunctional unsaturated monomer polymerizable with the alkyl(meth)acrylate monomer comprises styrene, nitrile, unsaturated carboxylic acid, acid anhydride, hydroxyl-containing acrylate, amide, allylglycidylether, glycidylmethacrylate, or a combination thereof.

6. The polylactic acid/polycarbonate resin composition of claim 1, wherein the polylactic acid/polycarbonate resin composition further comprises about 1 to about 20 parts by weight of (C) an impact-reinforcing agent based on about 100 parts by weight of the mixed resin.

7. The polylactic acid/polycarbonate resin composition of claim 6, wherein the impact-reinforcing agent comprises a core-shell copolymer obtained by grafting a unsaturated compound comprising an acrylic-based monomer, a hetero cyclic monomer, an aromatic vinyl monomer, an unsaturated nitrile monomer, or a combination thereof, onto a rubber polymer obtaining by polymerization of a diene-based monomer, an acrylic-based monomer, a silicon-based monomer, or a combination thereof.

8. A molded product made using the polylactic acid/polycarbonate resin composition according to claim 1.

* * * * *

UNITED STATES PATENT AND TRADEMARK OFFICE
CERTIFICATE OF CORRECTION

PATENT NO. : 8,835,558 B2  
APPLICATION NO. : 12/642063  
DATED : September 16, 2014  
INVENTOR(S) : Hyung-Tak Lee et al.

Page 1 of 1

It is certified that error appears in the above-identified patent and that said Letters Patent is hereby corrected as shown below:

In the Specification

Column 2, Line 15 reads: "from L-lactic acid, β-lactic acid, L,D-lactic acid, or a combi-"
and should read: "from L-lactic acid, D-lactic acid, L,D-lactic acid, or a combi-"

Column 4, Line 5 reads: "2,2-bis(3,5-dimethyl-4-hydroxyphenyl)propane, 2,2-2,2-bis"
and should read: "2,2-bis(3,5-dimethyl-4-hydroxyphenyl)propane, 2,2-bis(3,5-dichloro-4-hydroxyphenyl) propane, 2,2-bis"

Signed and Sealed this
Nineteenth Day of May, 2015

Michelle K. Lee
*Director of the United States Patent and Trademark Office*